United States Patent Office 2,819,618
Patented Jan. 14, 1958

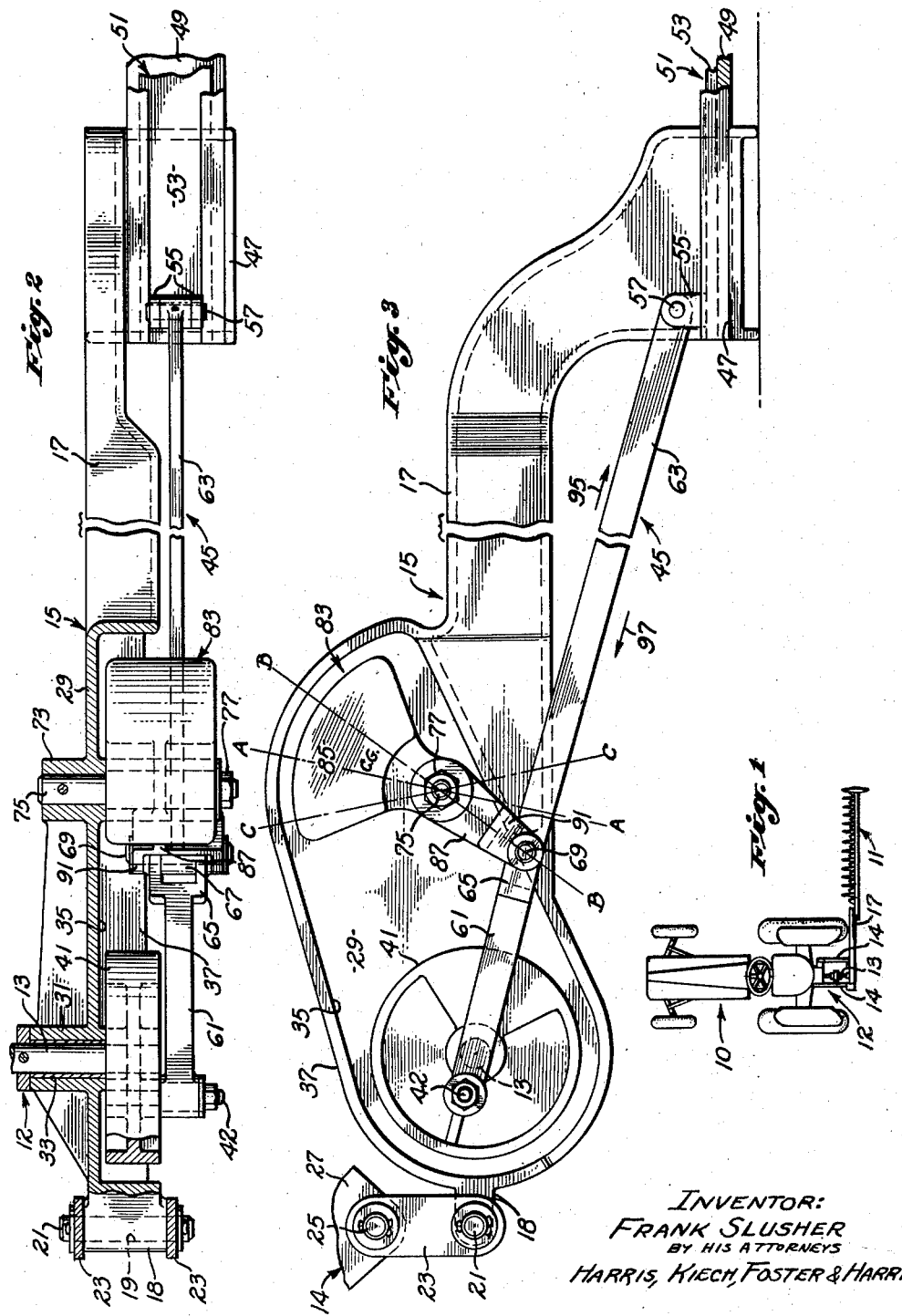

2,819,618

COUNTERBALANCING APPARATUS FOR RECIPROCATING SLIDE

Frank Slusher, Carpinteria, Calif.

Application May 4, 1953, Serial No. 352,729

2 Claims. (Cl. 74—44)

This invention relates to counterbalancing apparatus and, more particularly, to a counterbalancing apparatus which is incorporated in a mechanism for translating rotary to reciprocatory motion.

In order to clearly demonstrate the structure and the mode of operation of my invention, it will be described as applied to an apparatus utilized in conjunction with a conventional agricultural implement such as a mower but it is, of course, to be understood that the principles of my invention can be applied with equal efficacy to other types of driven instrumentalities which incorporate a reciprocatory driven element.

The problem of converting rotary to reciprocatory motion, in order to provide driving power for implements incorporating reciprocatory driven elements, has been a long standing one particularly in the field of agricultural implements where apparatus for converting rotary to reciprocatory motion are subjected to constant usage under adverse conditions. When an agricultural implement, for instance, a mower incorporating a reciprocatory sickle bar, is powered by a rotating power source such as the power take-off shaft of a tractor, conditions of extreme load are encountered at opposite ends of the path of movement of the sickle bar, resulting in the imposition of vibratory and shock loads upon the component portions of the driving apparatus and in the crystallization of certain of said component portions and the ultimate failure thereof.

In order to overcome the aforementioned vibratory and shock loads, a variety of counterbalancing apparatus for translating rotary to reciprocatory motion has been suggested. The bulk of these devices utilize rotary counterweights which are mounted upon the crankshaft of the power source or rotating components thereof in order to counterbalance the loads transmitted to the crankshaft through the reciprocatory components of the counterbalancing apparatus from the reciprocatory driven member. Unfortunately, such expedients have been found unsuitable because of the excessive loads placed upon the bearings supporting the counterweighted crankshaft and the fact that the crystallization of the reciprocatory components of the counterbalancing apparatus is not eliminated since the shock and vibratory loads are transmitted therethrough from the driven member to the counterbalanced crankshaft.

It is, therefore, a primary object of my invention to provide a counterbalancing apparatus for translating rotary to reciprocatory motion which includes a rotary drive member connected to a reciprocatory driven member by means of a reciprocatory connecting arm, said connecting arm having associated therewith a counterweight adapted to counterbalance shock loads encountered when the driven member reaches the opposite ends of its path of movement.

Another object of my invention is the provision in a device of the aforementioned character of a counterweight which is secured directly to the reciprocatory connecting arm, thus obviating the necessity for mounting the counterweight on the crankshaft or other rotary driving component of the apparatus and materially reducing the bearing loads encountered in a conventional counterbalancing apparatus.

An additional object of my invention is the provision in a device of the aforementioned character of a counterweight which is connected directly to the reciprocatory connecting arm of the apparatus so that shock and vibratory loads imposed upon said arm are not transmitted therethrough, but are absorbed directly therefrom, thus preventing the connecting arm from being used as a medium of translation of the shock and vibratory loads and materially prolonging the useful life of the connecting arm by preventing the crystallization thereof.

A further object of my invention is the provision in an apparatus of the aforementioned character of a counterweight which is not mounted directly upon the connecting arm, but which is mounted upon an elongated support so that the weight of the counterweight is not borne upon any portion of the counterbalancing apparatus but upon a supplementary support therefor, thus eliminating the relatively large loads encountered by the use of counterweights in prior art apparatus of the character under consideration.

Another object of my invention is the provision of a counterbalancing apparatus for translating rotary into reciprocatory motion which is constituted by a minimum number of parts, which can be easily and cheaply manufactured and which requires a minimum amount of upkeep and lubrication.

Other objects and advantages of my invention will be apparent from the following specification and the accompanying drawing which is for the purpose of illustration only and in which:

Fig. 1 is a utility view showing the manner in which the counterbalancing apparatus of my invention is mounted upon a tractor designed to serve as the source of motive power;

Fig. 2 is a partly sectional view of the counterbalancing apparatus of my invention; and Fig. 3 is a side elevational view of the counterbalancing apparatus of my invention.

Referring to the drawing and particularly to Fig. 1 thereof, I show a tractor 10 which is utilized both to bodily transport a mower 11 and to provide a source of motive power for the mower 11. The tractor 10 incorporates a power take-off indicated generally at 12 and including a rotary drive shaft 13. Secured to the rear end of the tractor 10 are mounting arms 14 designed to support and connect various parts of agricultural implements to the tractor 10 and, in the present instance, utilized to secure and support a counterbalancing apparatus 15 constructed in accordance with my invention upon the tractor 10.

The counterbalancing apparatus 15 includes an elongated housing 17, the housing 17 being provided at one end thereof with a bearing block 18 having a transverse bore 19 formed therein. Positioned in the transverse bore 19 and having its opposite ends extending therebeyond is a pivot pin 21, the pivot pin 21 engaging the lowermost ends of laterally spaced supporting shackles 23 whose upper ends are secured by means of a pivot pin 25 to a depending portion 27 of one of the mounting arms 14 of the tractor 10.

Formed integrally with the rear wall 29 at one end of the housing 17 of the counterbalancing apparatus 15 is an elongated, outwardly extending, bearing boss 31, said boss being provided with a bushing 33 which receives for rotation the end of the drive shaft 13. Mounted upon the end of the drive shaft 13 extending into a recess 35 defined by the rear wall 29 and a continuous peripheral wall 37 of the housing 17 is a flywheel 41, said flywheel being provided wtih a crank pin 42 for transmitting the rotary motion thereof to an elongated reciprocatory connecting member indicated generally at 45.

Formed integrally with the opposite end of the elongated housing 17 of the apparatus 15 is a horizontally disposed, laterably extending slideway 47 to which is secured the bed bar 49 of the mower 11 and in which is disposed, for reciprocatory movement therein, the inner end of a reciprocatory driven member 51 constituted in the present instance, by the end of the sickle bar 53 of the mower 11. The extreme inner end of the sickle bar 53 is provided laterally spaced lugs 55 in which is mounted a wrist pin 57 to which is secured the adjacent end of the connecting member 45. The connecting member 45 constitutes, in essence, an elongated pitman arm which is designed to convert the rotary movement of the flywheel 41 to reciprocatory movement and to transmit said reciprocatory movement to the end of the sickle bar 53 of the mower 11.

The elongated connecting member or arm 45 is constituted by first and second sections 61 and 63, the first section 61 being provided with a clevis 65, best shown in Fig. 2 of the drawing, which is maintained in operative relationship with a connecting boss 67 provided upon the adjacent end of the second section 63 by means of a pivot pin 69.

Formed integrally with the rear wall 29 of the housing 17 is a rearwardly extending boss 73, said boss being provided with a bore for mounting a pivot pin 75 which extends inwardly into the recess 35 defined by the rear wall 29 and the peripheral wall 37 of the housing 17. Mounted for rotation in a limited arc upon the pivot pin 75 and secured thereto as by means of a nut 77 is a counterweight 83, said counterweight being provided with an upper, massive portion 85 and lower, depending connecting arm 87. It should be noted that the counterweight 83 is mounted for rotation on the pivot 75 at a point substantially below its c. g., so that the counterweight 83 will effectively counterbalance shock and vibratory loads transmitted through the connecting arm 87 into the massive upper portion 85.

Formed integrally with the lowermost end of the connecting arm 87 of the counterweight 83 is a yoke 91, the opposite arms of which are secured to the pivot pin 69 which maintains the abutting ends of the first and second sections 61 and 63 of the elongated connecting member or arm 45 in operative relationship with each other.

It is, therefore, apparent that as the flywheel 41 is rotated upon the drive shaft 13, the elongated connecting arm 45 is reciprocated with respect to the housing 17 of the counterbalancing apparatus 15, thus, by virtue of its connection to the sickle bar 53 through the wrist pin 57, causing the reciprocation of the sickle bar 53 with reference to the bed bar 49. As such reciprocation occurs, the sickle bar 53 is moved between opposite limits of movement, its connection with the elongated connecting arm 45 serving to restrain it from movement beyond said limits. However, when the sickle bar 53 reaches its limits of movement, a heavy shock load resulting in vibratory frequencies being induced in the entire apparatus is encountered. In conventional devices or apparatus of the character here under consideration, such vibratory loads are transmitted through the reciprocatory components of the apparatus and into the crank or other rotary drive member incorporated therein, an effort being made to annul such loads by the incorporation in or association with the rotary drive member of the counterbalance means.

However, in my invention the counterweight 83, through its direct pivotal connection by means of the pivot pin 69, to the elongated connecting arm 45, serves to absorb and counterbalance the aforementioned undue shock loads encountered when the rapidly reciprocating sickle bar 53 reaches its opposite limits of movement.

Therefore, when the sickle bar 53 is shifted rapidly to the right in the direction of the arrow 95, the counterweight 83 is rotated about the pivot pin 75 into a position wherein it is inclined substantially along the longitudinal axis C—C, that is, the centers of the pivot pins 69 and 75 will lie substantially on said longitudinal axis with the result that the rapid movement of the massive upper portion 85 of the counterweight 83 serves to annul substantially all of the shock load generated by the rapid cessation of movement of the sickle bar 53 in its journey to the right.

Conversely, when the rotation of the flywheel 41 causes the elongated connecting arm 45 to move the sickle bar 53 to the left in the direction of the arrow 97, the upper massive portion 85 of the counterweight 83 is shifted to the position shown in Fig. 3 of the drawing wherein the centers of the pivots 69 and 75 lie along a common longitudinal axis B—B. During the intermediate travel of the sickle bar 53 and the elongated connecting arm 45, relatively little load is placed upon the bar 45 or the flywheel 41 since the counterweight 83 is supported on the pivot 75 and the only power loss is occasioned by the rotation thereof as induced by the reciprocation of the elongated connecting arm 45.

However, it will be noted that no direct load is placed upon the elongated connecting arm 45 since the counterweight 83 is supported on the elongated housing 17 by means of the pivot pin 75. In this manner, I have obviated the inherent disadvantages of prior art constructions wherein the counterweights are supported for rotation on or in association with the rotary drive or crank members of the apparatus, resulting in undue bearing loads and relatively large power losses during the entire cycle of operation. As a matter of fact, during the intermediate movement of the elongated connecting arm 45, between the opposite limits of movement heretofore defined, the only power loss is that attributable to the actual rotation of the counterweight 83 about the pivot pin 75. It will be noted that when the counterweight 83 is intermediate its opposite limits of movement, that is, when the centers of the pivot pins 69 and 75 lie coincident with the same longitudinal axis A—A, as well as at all other points during the rotation of the counterweight 83, the entire weight of the counterweight 83 is borne upon the pivot pin 75, thus removing the direct burden of supporting the weight of the counterweight from the power transmitting portions of the apparatus. This is a considerable advance over the prior art in that the bearing loads encountered in prior art devices and the complex gearing and cam arrangements necessitated by the direct connection of the counterweight with the rotary drive members of prior art devices are eliminated.

Of course, another major advantage inherent to the above described provision of a separate support for the counterweight 83, as exemplified by the pivot pin 75 and, more particularly, in the connection of the connecting arm 87 thereof, intermediate the ends of the elongated connecting arm 45, is the fact that the shock and vibratory loads induced by the sickle bar 53 are not transmitted through the elongated connecting arm 45 to the rotary drive member, but are absorbed by the counterweight 83 before they can be transmitted into the rotary drive member. Of course, this materially reduces the bearing wear encountered in the rotary drive members since the counterweight 83 isolates the rotary drive member 41 from substantially all vibratory and shock loads. Furthermore, crystallization encountered in the connecting arm 45 itself is substantially reduced because the shock loads and other peak loads encountered at the opposite limits of movement of the sickle bar 53 are transmitted directly from the elongated connecting arm 45 into the counterweight 83.

Furthermore, due to the relative lack of complexity of the counterbalancing apparatus of my invention, the component portions thereof can be constructed in a relatively massive fashion, materially increasing both the strength of the components and the over-all life thereof. In addition, because of the relatively simple nature of the components, they can be dismounted for servicing and/or repair and reassembled in a minimum amount of time.

I claim as my invention:

1. In a counterbalancing apparatus for converting rotary to reciprocatory movement, the combination of: an elongated supporting frame; a rotatable drive member mounted at one end of said frame; a reciprocatory driven member mounted at the opposite end of said frame; an elongated connector comprising a pair of arms pivotally coupled end-to-end by a pivot pin, said connector being attached between said drive and driven members; a pivot attached in said frame and spaced from said connector; and an oscillatory counterweight mounted below its center of gravity on said pivot and pivotally attached to said connector between the ends thereof.

2. In an apparatus for converting rotary to reciprocatory motion, the combination of: an elongated supporting frame; a drive shaft journaled in said frame at one end thereof and having a rotary drive member mounted thereupon; a driven member mounted on the other end of said frame for reciprocatory movement therein; an elongated connector constituted by a pair of arms attached in abutting relationship by a pivot pin and joining said drive and driven members; and an oscillatory counterbalance pivoted on said frame and attached to said pivot pin connecting said arms.

References Cited in the file of this patent

UNITED STATES PATENTS

| | | |
|---|---|---|
| 289,019 | Nash | Nov. 27, 1883 |
| 2,190,070 | Holzer | Feb. 13, 1940 |
| 2,314,789 | Jacobsen | Mar. 23, 1943 |